United States Patent
Heller et al.

(10) Patent No.: US 8,494,012 B2
(45) Date of Patent: Jul. 23, 2013

(54) RAMAN CONVERTING LASER SYSTEMS

(75) Inventors: Donald F. Heller, Somerset, NJ (US);
Marc Klosner, South Orange, NJ (US);
Brian A. Pryor, Newark, DE (US);
Thangavel Thevar, Aberdeen (GB);
Bruce Boczar, Feasterville Trevose, PA (US)

(73) Assignee: Light Age, Inc., Somerset, NJ (US)

( * ) Notice: Subject to any disclaimer, the term of this patent is extended or adjusted under 35 U.S.C. 154(b) by 0 days.

(21) Appl. No.: 13/440,919

(22) Filed: Apr. 5, 2012

(65) Prior Publication Data

US 2012/0314722 A1    Dec. 13, 2012

Related U.S. Application Data

(60) Provisional application No. 61/471,765, filed on Apr. 5, 2011.

(51) Int. Cl.
*H01S 3/30*        (2006.01)
(52) U.S. Cl.
USPC .................................................. 372/3
(58) Field of Classification Search
USPC .................................................. 372/3
See application file for complete search history.

(56) References Cited

U.S. PATENT DOCUMENTS

| | | | |
|---|---|---|---|
| 4,353,617 A | | 10/1982 | Tokumitsu et al. |
| 5,099,147 A | | 3/1992 | Gregor et al. |
| 5,272,717 A | * | 12/1993 | Stultz ............................. 372/3 |
| 5,696,778 A | * | 12/1997 | MacPherson .................. 372/4 |
| 5,796,761 A | | 8/1998 | Injeyan et al. |
| 7,433,116 B1 | | 10/2008 | Islam |
| 2002/0105997 A1 | | 8/2002 | Zhang |
| 2009/0022201 A1 | | 1/2009 | Krupke et al. |
| 2009/0039245 A1 | | 2/2009 | Brown et al. |
| 2009/0204110 A1 | | 8/2009 | Islam |

OTHER PUBLICATIONS

International Search Report issued in International Application No. PCT/US2012/032428 on Jul. 23, 2012.
Siegman, "How to (Maybe) Measure a Laser Beam Quality", Tutorial presentation at the Optical Society of America Annual Meeting, Long Beach, California, Oct. 1997.
Wada et al., "Two-Stage Raman Converter Covering the Whole Infrared Spectrum with Tunable Solid-State Lasers", Applied Physics B 57, pp. 435-439 (1993).

* cited by examiner

*Primary Examiner* — Kinam Park
(74) *Attorney, Agent, or Firm* — Greenberg Traurig, LLP

(57) ABSTRACT

In one embodiment, the instant invention provides a method that includes: outputting a first laser beam having: a beam quality factor (M2) between 1 and 5, and a spectral width of less than 0.15 nm, where the outputting is performed by a laser generating component that includes a alexandrite laser oscillator; converting the first laser beam through a first Raman cell to produce a second laser beam, where the first Raman cell is filled with a first gas; and converting the second laser beam through a second Raman cell to produce a final laser beam, where the second Raman cell is filled with a second gas and is operationally positioned after the first Raman cell, where the first gas and the second gas are different gasses, and where the final laser beam having: a second energy of at least 1 mJ, and at least one wavelength longer than 2.5 micron.

16 Claims, 15 Drawing Sheets

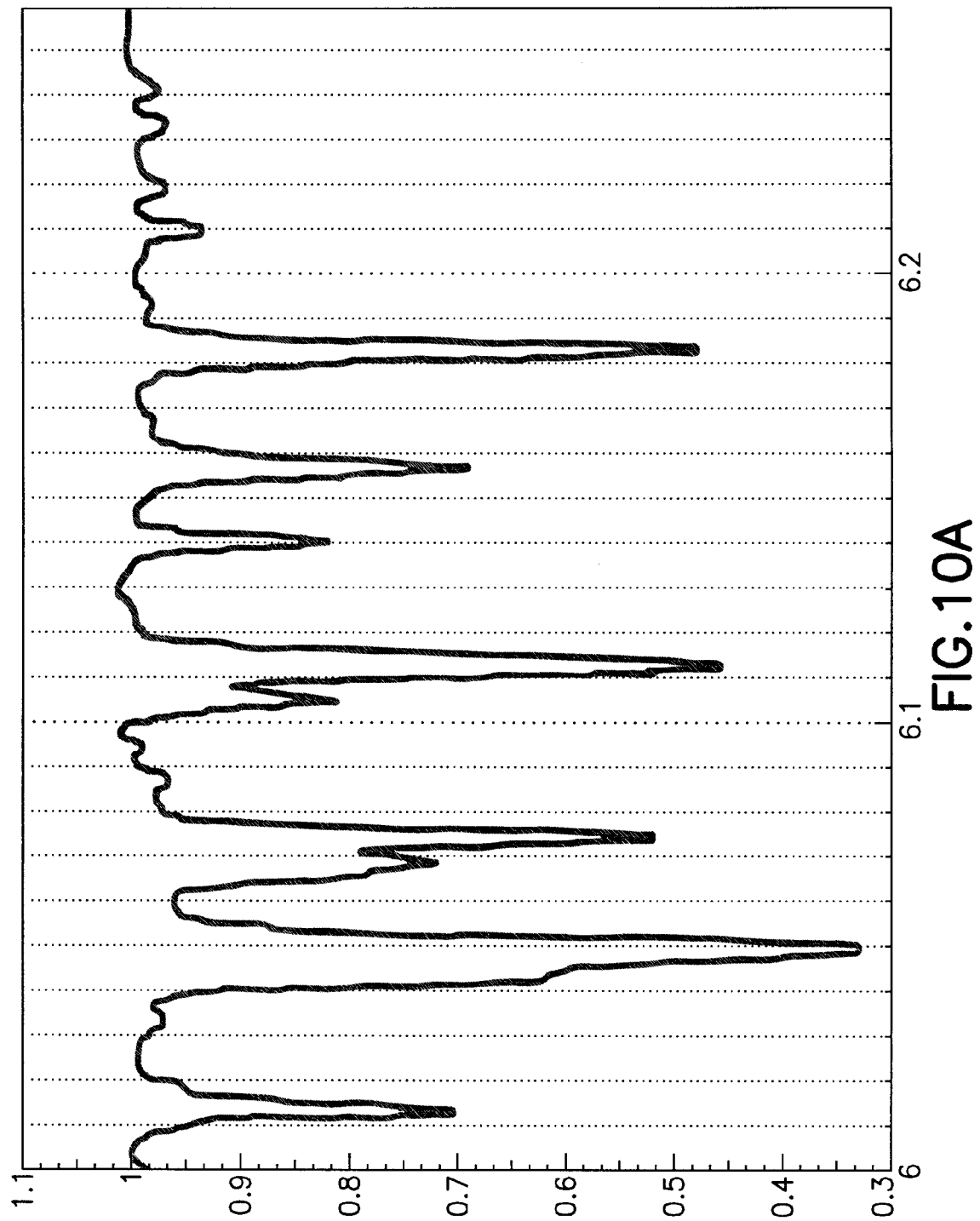

RAMAN CONVERTING LASER SYSTEMS

RELATED APPLICATIONS

This application claims the priority of U.S. provisional application Ser. No. 61/471,765, entitled "METHOD AND APPARATUS FOR LASER TISSUE ABLATION," filed on Apr. 5, 2011, which is incorporated herein by reference in its entirety for all purposes.

STATEMENT REGARDING FEDERALLY SPONSORED RESEARCH OR DEVELOPMENT

This invention was made with government support under the following contracts awarded by the following agencies:

National Institute of Health, Grant No. 2R44RR024070-02A1;

National Institute of Health, Grant No. 1R21EY019752-01;

National Institute of Health, Grant No. 2P30EY008126-22; and

Department of Defense, Grant No. W81XWH-08-C-0109.

The government has certain rights in the invention.

TECHNICAL FIELD

In some embodiments, the instant invention relates to laser systems.

BACKGROUND

Stimulated Raman scattering can be used to generate tunable infrared radiation by converting visible or infrared pump pulses.

SUMMARY OF INVENTION

In some embodiments, the instant invention provides a method that at least includes the steps of: (a) outputting a first laser beam having: a beam quality factor ($M^2$) between 1 and 5, and a spectral width of less than 0.15 nm (FWHM), where the outputting is performed by at least one laser generating component that comprises at least one alexandrite laser oscillator; (b) converting the first laser beam through at least one first Raman cell to produce a second laser beam, where the at least one first Raman cell is filled with a first gas and is operationally positioned to receive the first laser beam outputted by the at least one laser generating component, and (c) converting the second laser beam through at least one second Raman cell to produce a final laser beam, where the at least one second Raman cell is filled with a second gas and is operationally positioned after the at least one first Raman cell, where the first gas and the second gas are different gasses, and where the final laser beam having: a second energy of at least 1 mJ, and at least one wavelength longer than 2.5 micron.

In some embodiments, the instant invention can include the at least one laser generating component that further includes at least one laser amplifier. In some embodiments, the instant invention can result in the first laser beam that has energy of at least 200 mJ.

In some embodiments, the instant invention can include the first gas that is deuterium and the second gas that is hydrogen. In some embodiments, the instant invention can include the at least one second Raman cell filled with hydrogen at a pressure of at least 150 psi.

In some embodiments, the instant invention can include a step of removing at least a portion of water from the at least one second Raman cell. In some embodiments, the removing the at least portion of water can result in a concentration of water in the at least one second Raman cell to be below about 100 parts per million (ppm).

In some embodiments, the instant invention can result in the final laser beam that has: the second energy of at least 4 mJ, and the at least one wavelength is between 6 and 7 nm.

In some embodiments, the instant invention can result in the beam quality factor ($M^2$) is between 1 and 2.5.

In some embodiments, the instant invention can further include steps of: focusing the first laser beam by utilizing at least one first set of zoom focusing lenses, and focusing the second laser beam by utilizing at least one second set of zoom focusing lenses.

In some embodiments, the instant invention can further include steps of: arranging at least one first Raman resonator so that the at least one first Raman resonator is operationally positioned to direct laser beams through the at least one first Raman cell, and arranging at least one second Raman resonator so that that the at least one second Raman resonator is operationally positioned to direct laser beams to pass a plurality of times through the at least one second Raman cell. In some embodiments, the arranging the at least one first Raman resonator is such that the at least one first Raman resonator directs laser beams to pass a plurality of times through the at least one first Raman cell.

In some embodiments, the at least one laser generating component can further include optics having a curvature that results in a size of an output $TEM_{oo}$ mode of the first laser beam that is about 1.5 times smaller than a diameter of an intra-cavity aperture that limits a size of the first laser beam. In some embodiments, the at least one laser generating component can further include at least one etalon selected from the group consisting of: a planar etalon and a confocal etalon.

In some embodiments, the instant invention can further include steps of: circulating, by at least one fan, the first gas in the at least one first Raman cell, hereby minimizing thermo-optic distortions while operating the at least one laser generating component at a repetition rate of at least 5 Hz.

In some embodiments, the instant invention can further include step of directing the final laser beam onto at least one material, hereby changing at least one physical characteristic of the at least one material.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIGS. 10A-10C show yet some other graphs related to some embodiments of the instant invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive.

While some embodiments of the instant invention as described herein are related to methods of producing a laser beam having energy between 4 and 10 mJ and at least one wavelength in a range between 6 and 7 microns (μm) nm; it is understood that the instant invention is not limited to those embodiments and/or examples which are only exemplary of the instant invention.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

Further, as used herein, 1 um=1 μm=1 micrometre=$1 \times 10^{-6}$ meter (m).

Figure 1:
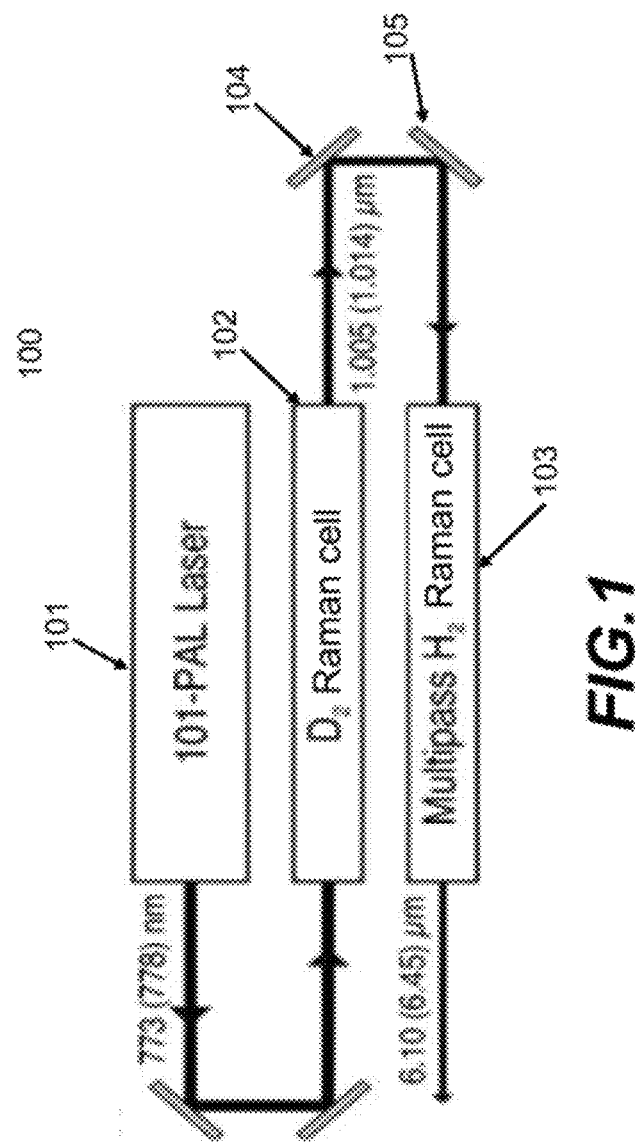
FIG. 1 shows a schematic diagram representing some embodiments of the instant invention.

In some embodiments, the instant invention provides a Raman-shifted alexandrite laser system. As shown in FIG. 1, in some embodiments, the Raman-shifted alexandrite laser system can include a tunable, Q-switched alexandrite laser (101) that pumps a plurality of Raman cells. In some embodiments, non-tunable lasers and other tunable laser sources (e.g., Ti:Sa laser, optical parametric oscillators) can be used with the invention to yield specific wavelengths of interest.

A laser oscillator typically consists of a laser gain medium that is placed within an optical cavity (or optical resonator). An optical cavity/resonator typically is an arrangement of mirrors that provides feedback of the laser light that is generated within the gain medium. Laser beam parameters such as $M^2$ and linewidth are determined primarily by the oscillator design. The so-call "Beam Quality Factor" or $M^2$ (stated as "M-squared" when spoken) is a standardized measurement for defining beam quality. The "Beam Quality Factor" is a number that typically quantifies how much a laser beam deviates from what is theoretically best, where $M^2=1$ is the theoretical best. $M^2$ is measured with a "Laser Beam Analyzer", which is a CCD camera, driven by specialized software to analyze the recorded laser beam. For example, see Siegman, A. E. (October 1997), "How to (Maybe) Measure Laser Beam Quality," Tutorial presentation at the Optical Society of America Annual Meeting, Long Beach, Calif., http://www.stanford.edu/~siegman/beams_and_resonators/beam_quality_tutorial_osa.pdf provides examples on how to measure the laser beam quality, whose specific disclosures on measuring the laser beam quality are incorporated herein by reference for all purposes.

In some embodiments, the fundamental output of the alexandrite laser can have a spectral width of less than 0.15 nm (full width at half maximum) (FWHM). In some embodiments, the fundamental output of the alexandrite laser can have a spectral width of less than 0.10 nm (full width at half maximum) (FWHM). In some embodiments, the fundamental output of the alexandrite laser can have a spectral width of less than 0.5 nm (full width at half maximum) (FWHM).

In some embodiments, the fundamental output of the alexandrite laser is tuned to operate at wavelengths from about 771 to about 785 nm ($\omega_0$=12740-12970 cm$^{-1}$). For example, in FIG. 1, the alexandrite laser is shown producing output at wavelengths of 773 or 778 nm.

Some general principles of the Raman conversion are described in Wada, H. Tashiro, Y. Urata, L. T. Thi, A. Kasai, and K. Toyoda, "Two-stage Raman converter covering the whole infrared spectrum with tunable solid-state lasers," Appl. Phys. B 57(6), 435-439 (1993), which is incorporated herein by reference in its entirety for such specific purpose.

In some embodiments, the fundamental output of the alexandrite laser directly pumps one or more first Raman cells filled with a first gas. In some embodiments, the laser beam generated by the laser passes through a plurality of the first Raman cells filled with the first gas. In some embodiments, as shown in FIG. 1, the first Raman cell contains deuterium and the fundamental output of the alexandrite laser interacts with the D-D stretching mode of the deuterium gas ($\Omega_{D2}$=2991 cm$^{-1}$) by the nonlinear process of stimulated Raman scattering. In some embodiments, this first Raman cell (102) is designed to optimize production of 1st order Stokes-shifted output ($\omega_1$) near 1.01 μm (the exact wavelength is determined by the tuning of the alexandrite fundamental ($\omega_0$), such that $\omega_1=\omega_0-\Omega_{D2}$). For example, as shown in FIG. 1, the fundamental output of the alexandrite laser can undergo a 1st order Stokes shift in the deuterium ($D_2$) converter to yield 1.005- or 1.014-μm light.

In some embodiments, this nominal 1.01-μm ($\omega_1$) output in turn pumps one or more second Raman cells filled with a second gas (103). In some embodiments, as shown in FIG. 1, the second gas is hydrogen. In some embodiments, the first and the second gases are different. For example, the first gas can be deuterium and the second gas can be hydrogen, or the first gas can be hydrogen and the second gas can be deuterium.

In some embodiments, the laser beam exiting from one or more first Raman cells, which are filled with the first gas, passes through one or more second Raman cells filled with the second gas. In some embodiments, the instant invention can utilize multiple passes of laser beam through one or more of the second Raman cells (103), so that the stimulated Raman scattering from the hydrogen gas ($\Omega_{H2}$=4155 cm$^{-1}$) can terminally produce 2nd order Stokes-shifted output ($\omega_2$) with a wavelength, for example, in the 6- to 7-μm range ($\omega_2=\omega_1-2\Omega_{H2}$).

As shown in FIG. 1, in some embodiments, the instant invention can produce output at 6.10 and 6.45 μm. In some embodiments, the instant invention can utilize the alexandrite pump laser having energy up to 300 mJ/pulse. In some embodiments, the instant invention can utilize the alexandrite pump laser having energy up to 400 mJ/pulse. In some embodiments, the instant invention can utilize the alexandrite pump laser having energy up to 500 mJ/pulse. In some embodiments, the instant invention can utilize the alexandrite pump laser having energy up to 600 mJ/pulse. In some embodiments, the instant invention can utilize the alexandrite pump laser having energy up to 700 mJ/pulse. In some embodiments, the instant invention can utilize the alexandrite pump laser having energy up to 800 mJ/pulse.

Figure 2:
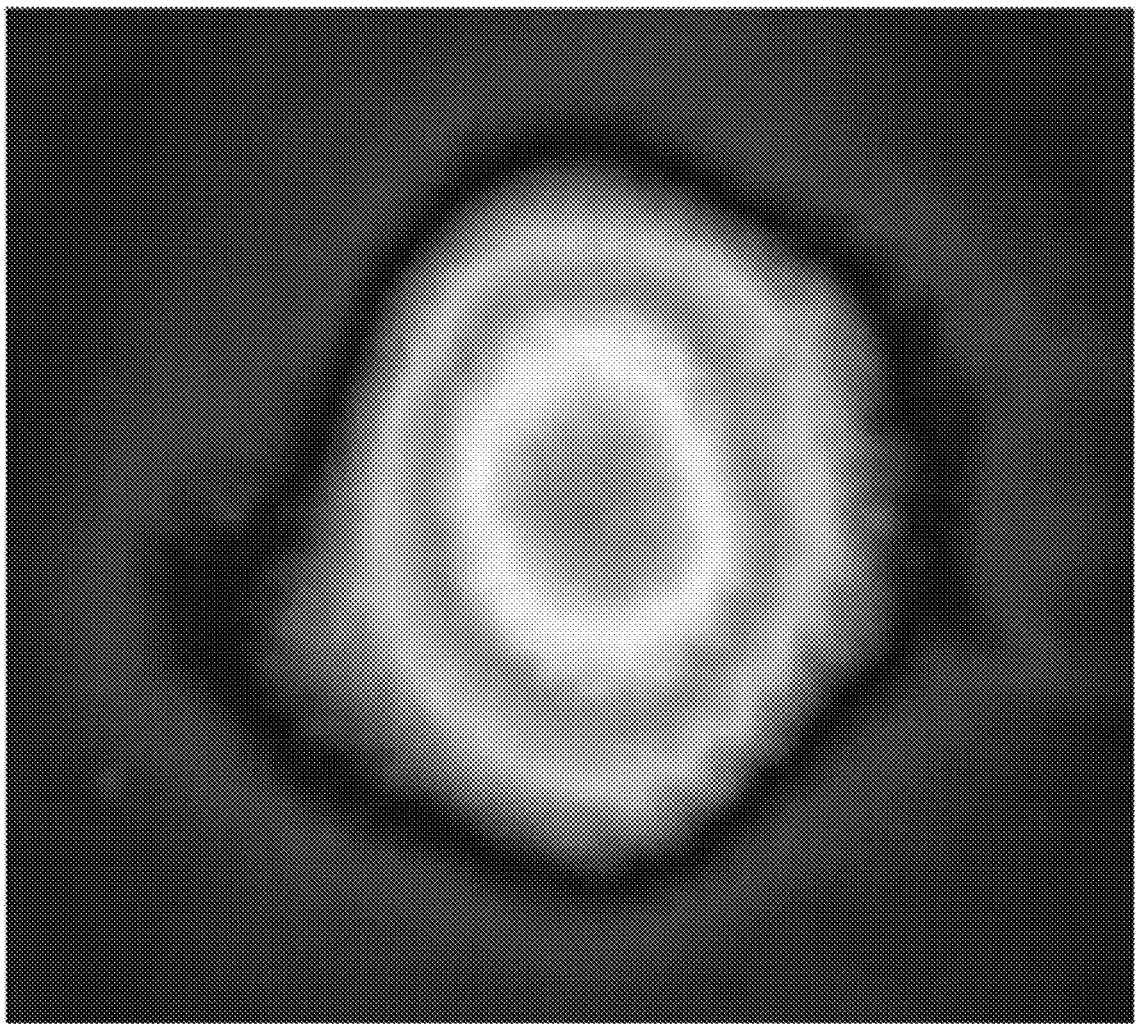
FIG. 2 shows some features related to some embodiments of the instant invention.

FIG. 2 shows a typical profile of the output beam, taken from a laser operating with a single oscillator and two amplifiers. In some embodiments, 250-mJ fundamental pulses in a range of 30-80 nanoseconds (ns) from the alexandrite laser can be first converted to approximately 50-mJ pulses of nominally 1.01-μm light and subsequently converted to 1- to 3-mJ pulses in the 6- to 7-μm wavelength range. In some embodiments, the suitable laser is capable of generating pulses having energy of over 400 mJ.

In some embodiments, the instant invention can control the focus to ensure that the energy density is low enough (e.g., approximately less than 5-10 J/cm^2) such that coatings of multipass hydrogen convertor mirrors (104, 105) are not damaged. For example, some embodiments can attain pulse energies up to 4 mJ at a wavelength of 6.1 μm. For example, some embodiments can attain energies to 9 mJ at 6.1 μm. For example, some embodiments can attain energies about 10 mJ within the 6-7-μm wavelength range. In some embodiments, the instant invention can achieve wavelengths that can have energies above 10 mJ and be within, below, or above the 6-7-μm wavelength range.

In some embodiments, the laser can be configured with output coupler yielding optimal performance from approximately 770-785 nm.

In some embodiments, during the nonlinear Raman conversion process, the 50-ns pulsewidth of the alexandrite laser is shortened to 10-20 ns while the spatial mode structure remains smooth with a nearly Gaussian profile at 6.3 μm, as shown in FIG. 2. In some embodiments, similar spatial beam profiles can be, for example, obtained from 6 to 7 μm.

In some embodiments, one or more first Raman cells filled with the first gas (e.g., deuterium) (102) can be operated in a double-pass configuration. In some embodiments, the instant invention can include periodically refilling the first gas in one or more first Raman cells (102), in the event that the first gas becomes contaminated.

In some embodiments, one or more second Raman cells filled with the second gas (103) can be operated with a high number of passes. Table 1 demonstrates the exemplary regimes at which one or more second Raman cells filled with hydrogen (103) can be operated. Table 1 represents data produced with 1 micron input energy at about 110 mJ and one or more second Raman cells configured with a mirror having approximately >96% reflectivity at wavelengths ranging from 1-7 microns.

TABLE 1

| Number of passes | Mid-IR output (mJ) |
|---|---|
| 7 | 1.8 |
| 9 | 2.4 |
| 11 | 3.1 |
| 13 | 3.9 |
| 15 | 4.9 |
| 17 | 5.2 |
| 19 | 4.9 |

In some embodiments, each pass of the multi-pass process detailed in Table 1 can be substituted by having the light passes through an additional second Raman cell. For example, instead of having light pass 7 times through or within a single second Raman cell, in some embodiments, the light passes once through a series of 7 second Raman cells.

In some embodiments, the multi-pass results given in Table 1 can be utilized to achieve the sufficient efficiency of Raman conversion even with a relatively low Raman gain coefficient, for example, in the 6- to 7-μm wavelength region.

In some embodiments, the output energy from the deuterium converter (102) and the multi-pass converter (103) can be measured using a thermopile-based power meter (e.g., 30A-P, Ophir-Spiricon Inc., Logan, Utah) and/or a pyroelectric energy meter (e.g., J25, Coherent-Molectron Inc., Santa Clara, Calif.), respectively. In some embodiments, the alignment of mirrors and the light passing through one or more second Raman cells filled with the second gas (103) can be verified by utilizing, for example, an IR camera (Pyrocam III, Ophir-Spiricon).

In some embodiments, one or more second Raman cells with the second gas (103) can be periodically baked, purged and refilled with hydrogen to eliminate residual water vapor that can build-up in concentration over time. In some case, water vapor might have strong absorption in the 6- to 7-μm wavelength range, and even minute amounts of water can have an observable effect on conversion efficiency—most prominently at mid-IR wavelengths corresponding to water vapor lines.

Figure 3:
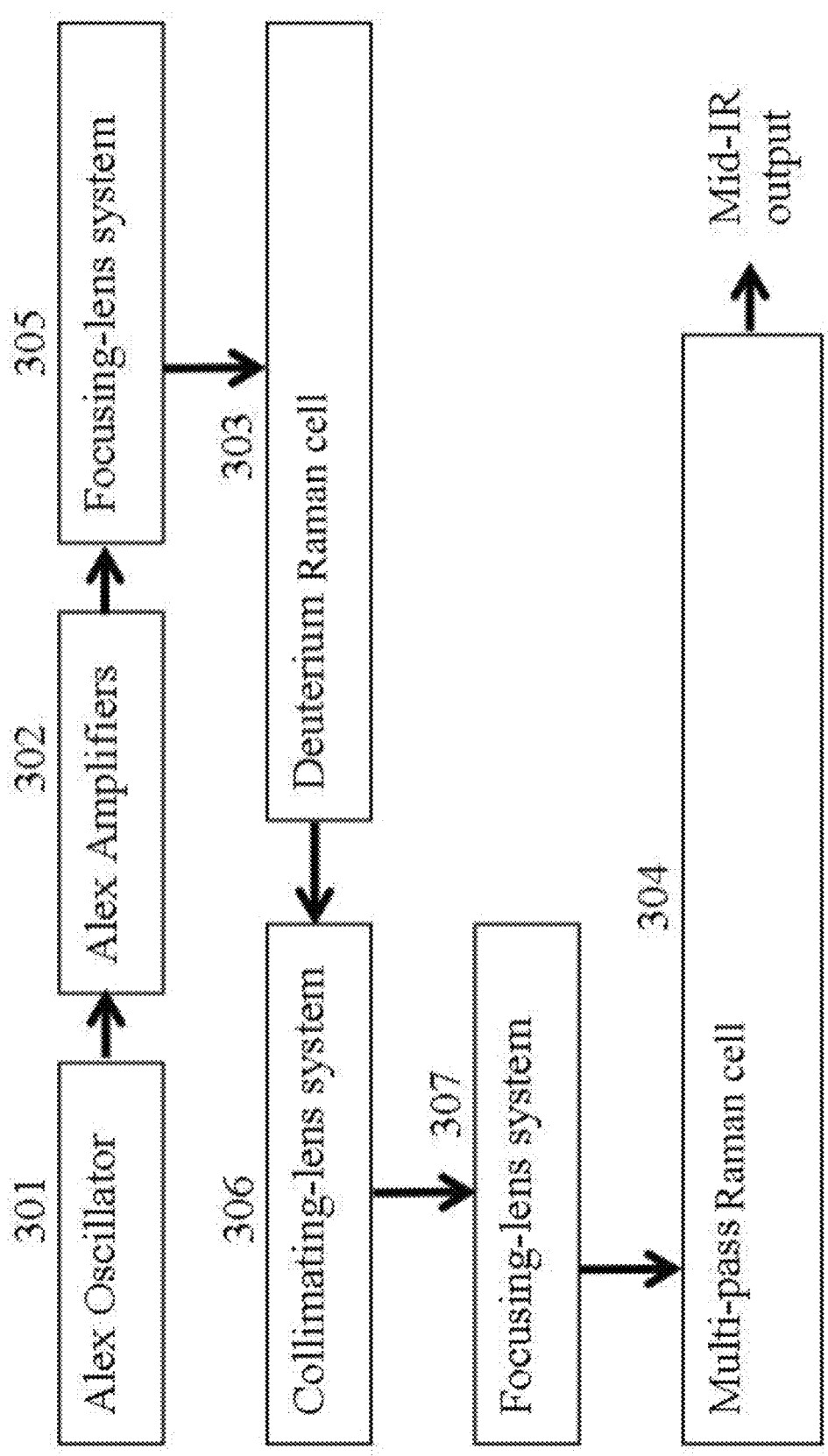
FIG. 3 shows a schematic diagram representing some embodiments of the instant invention.

FIG. 3 illustrates a schematic arrangement of system utilizing an alexandrite laser and the Raman conversion in accordance with some embodiments of the instant invention. As shown in FIG. 3, the alexandrite laser of the instant invention can include at least one oscillator (301) and at least one amplifier stage (302). In some embodiments, the laser can include at least one oscillator (301) and two amplifier stages (302), yielding up to 600 mJ. In some embodiments, at least one amplifier (302) can be configured for at least a double-pass operation, yielding yet higher powers, without the need for additional amplifier stages.

In some embodiments, the oscillator (301) and amplifier (302) stages can be designed and configured to yield sufficient laser beam quality and pulse energy to obtain photon conversion efficiency of about 30% or higher. In some embodiments, the oscillator (301) and amplifier (302) stages can be designed and configured to yield sufficient laser beam quality and pulse energy to obtain photon conversion efficiency of about 50% or higher. In some embodiments, the oscillator (301) and amplifier (302) stages can be designed and configured to yield sufficient pulse energy and laser beam quality to obtain photon conversion efficiency of about 70% or higher. In some embodiments, the oscillator (301) and amplifier (302) stages can be designed and configured to yield sufficient pulse energy and laser beam quality to obtain photon conversion efficiency of about 70% or higher. In some embodiments, the oscillator (301) and amplifier (302) stages can be designed and configured to yield sufficient pulse energy and laser beam quality to obtain photon conversion efficiency of about 95% or higher.

In some embodiments, a resonator/optical cavity (e.g., an arrangement of mirrors that forms a standing wave resonator for light waves in a laser) and a beam delivery system can utilize kinematically mounted optical components to achieve long-term output energy and beam-pointing stability. In some embodiments, the laser wavelength can be tuned by means of adjustments of intra-cavity optical components, in a manner such that alignment can be maintained when scanning the wavelength over the operating range of 6-7 μm.

In some embodiments, the sufficient beam quality in accordance with the principles of the instant inventions ($M^2$) equals to approximately 2. In some embodiments, the sufficient beam quality in accordance with the principles of the instant inventions ($M^2$) varies between approximately 1 and 5.

In some embodiments, to achieve the sufficient laser beam quality, the instant invention can utilize an oscillator pump chamber with a dual-ellipse that specularly (i.e., in a mirror-like fashion) focuses the flashlamps onto the laser rod. In some embodiments, the dimensions of the dual-ellipse can be sufficiently matched to the flashlamp separation. For the amplifiers (302), in some embodiments, the beam can be passed through the region of the rod where optical distortions are minimized (e.g., not near the edges of the laser rod) and/or a "diffuse reflector" can be utilized to scatter light (rather than specularly reflect light), so as to produce more uniform illumination of the laser rod than in the case of a specular reflector.

In some embodiments, the instant invention can utilize a single oscillator pump chamber and a plurality of amplifier pump chambers. In some embodiments, the instant invention can utilize a plurality of oscillator pump chambers and a single amplifier pump chamber. In some embodiments, the instant invention can utilize a plurality of oscillator pump chambers and a plurality of amplifier pump chambers.

In some embodiments, for the two-amplifier system, the output beam from the alexandrite laser passes through the first amplifier, and the output beam from the first amplifier passes through the second amplifier. Lenses can be placed before and/or after both amplifiers to compensate for the thermal lens of the amplifiers, so that the laser beam can remain essentially collimated as it passes through the two amplifiers, yielding a smooth, Gaussian-like profile.

In some embodiments, the instant invention can further utilize a laser cavity (optical resonator) that can yield the sufficient beam quality (e.g., $M^2 \sim 2$) by selecting a curvature of the resonator optics as well as the repetition rate of the laser (which affects the thermal lens), such that the size of the resulting TEMoo mode of the resonator is approximately 1.5 times smaller than the diameter of an intra-cavity aperture.

In some embodiments, the oscillator (301) can further include at least one intra-cavity etalon to reduce the laser linewidth, thereby enhancing the photon conversion efficiency. In some embodiments, the intra-cavity etalon can be in a form of at least two very flat, very parallel mirrors (planar etalon). In some embodiments, the intra-cavity etalon can be in a form of at least two identical spherical mirrors with their concave sides facing each other and with the distance between the mirrors equal to each mirror's radius of curvature (confocal or spherical etalon).

As shown in FIG. 3, the light generated by the laser system passes through a first focusing-lens system (305) and pumps one or more deuterium-filled Raman cells (303). In some embodiments, the instant invention can control the angle at which the pump laser light is focused within the Raman convertor by further utilizing a zoom lens system to control the size of the beam that is incident upon the focusing lens. In some embodiments, the laser pump beam, which pumps one or more first Raman cells filled with the first gas (e.g., deuterium) (303), can be focused such that an optimum numerical aperture (NA), which is the half-angle of the focused laser beam, is, for example, approximately 2 mrad. In some embodiments, to determine an optimum NA, one or more of the following factors can be considered:

a) If a focusing NA is lower than the optimal NA:

1) the Rayleigh range of the pump beam could be greater than the length of the Raman cell, resulting in lower efficiency, and 2) there could be an increased risk of damaging the coated windows of the Raman cells owing to the smaller beam size on the windows;

b) If a focusing NA is higher than the optimal NA:

1) the efficiency of Raman conversion to the desired wavelengths could be reduced owing to four-wave mixing that seeds the growth of higher-order Stokes beams, 2) the tighter focus that results from higher NA could lead to higher peak intensities, which could enhance other non-linear effects (e.g., self-focusing, Brillouin scattering, and backward-Raman scattering) that compete with the Raman process, and 3) higher NA could result in Stokes heating within a smaller gas volume, leading to larger refractive index changes in the Raman-active gas, causing scattering losses.

In some embodiments, the optical efficiency is optimized by utilizing entrance and exit windows having anti-reflection coatings at the pump (770-785 nm) and first-Stokes (1000-1025 nm) wavelengths. In some embodiments, the laser beam can be passed through one or more first Raman cells filled with the first gas (e.g., deuterium) (303) multiple times (e.g., double-, triple-, n-pass operation). In some embodiments, the instant invention can further utilize at least one Raman resonator and/or seeding to influence Raman conversion efficiency.

In some embodiments, the instant invention can further utilize at least one recirculation fan for one or more first and second Raman cells. In some embodiments, one or more first and second Raman cells contain at least one recirculation fan that can circulate the first gas (e.g., deuterium) and/or the second gas (e.g., hydrogen) respectively such that thermo-optic distortions are essentially eliminated while operating the pump laser at a repetition rate of at least 5 Hz. In some embodiments, one or more first and second Raman cells contain at least one recirculation fan that can circulate the first gas (e.g., deuterium) and/or the second gas (e.g., hydrogen) respectively such that thermo-optic distortions are essentially eliminated while operating the pump laser at a repetition rate of at least 10 Hz. In some embodiments, one or more first and second Raman cells contain at least one recirculation fan that can circulate the first gas (e.g., deuterium) and/or the second gas (e.g., hydrogen) respectively such that thermo-optic distortions are essentially eliminated while operating the pump laser at a repetition rate of at least 15 Hz. In some embodiments, one or more first and second Raman cells contain at least one recirculation fan that can circulate the first gas (e.g., deuterium) and/or the second gas (e.g., hydrogen) respectively such that thermo-optic distortions are essentially eliminated while operating the pump laser at a repetition rate between 5 Hz and 15 Hz.

Figure 4:
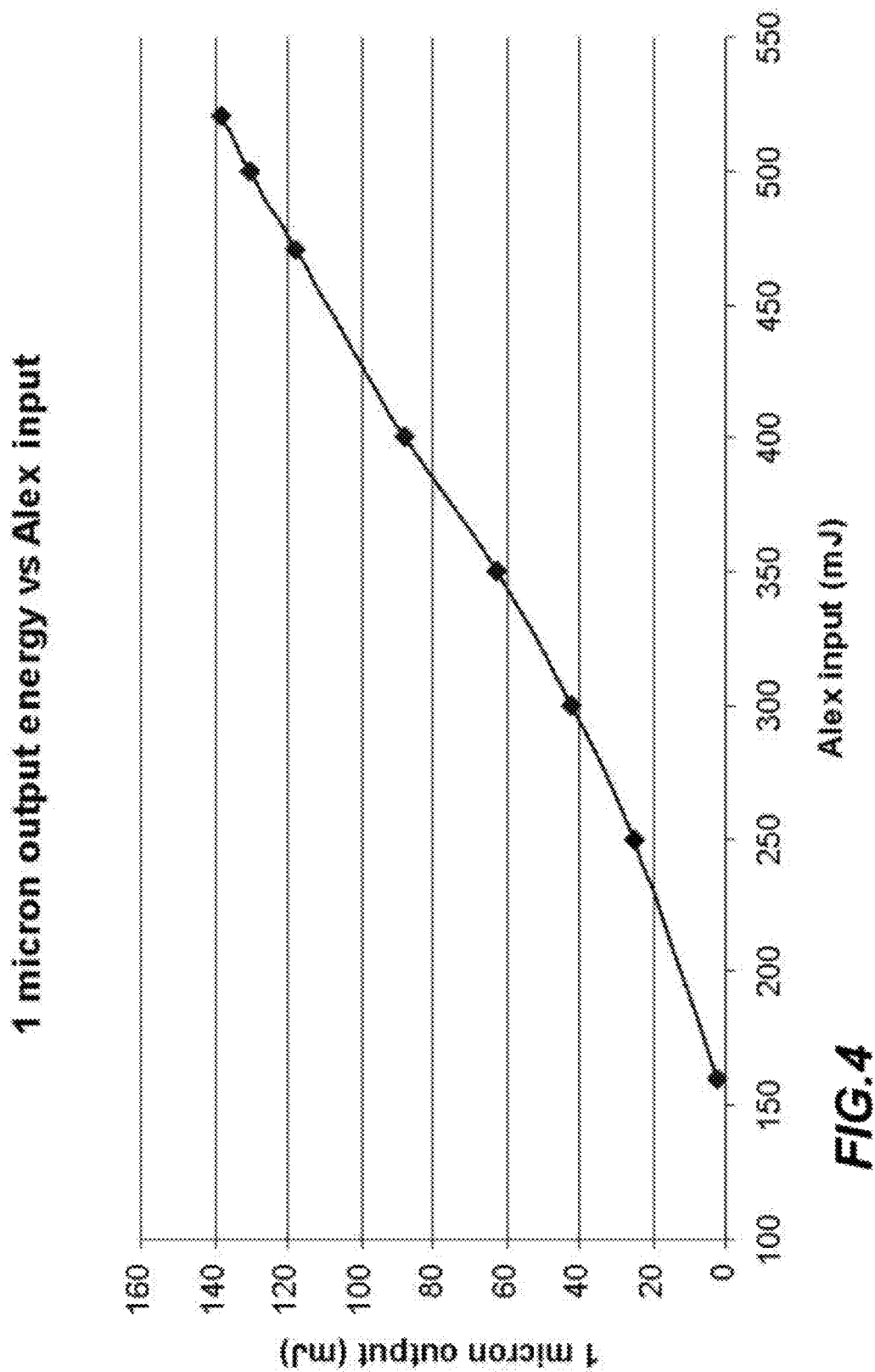
FIG. 4 shows a graph related to some embodiments of the instant invention.

FIG. 4 illustrates a performance of the Raman conversion of the light that passes through one or more first Raman cells (303) filled with deuterium as the first gas.

In some embodiments, the instant invention can utilize at least one etalon within the laser cavity of the laser to augment/enhance the performance of the Raman conversion when the light passes through one or more first Raman cells (e.g., 303) filled with first gas. In one example, a narrower-bandwidth beam produced due to utilizing the etalon can effect the Raman conversion efficiency because the Raman gain coefficient includes at least one factor that depends upon the laser bandwidth (i.e., the linewidth factor). In another example, in some embodiments, installing an etalon within the laser cavity can increase the output from one or more first Raman cells (303) filled with deuterium as the first gas by 40-50%, with a current output level of approximately 130 mJ/pulse when pumped by 475 mJ/pulse from the alexandrite laser. In yet another example, if the threshold for the Raman conversion is approximately 175 mJ, then the Raman conversion efficiency is approximately 45% for energies above the threshold energy.

Table 2 illustrates examples of performance of the Raman conversion when the light, from the laser system having at least one etalon within the laser cavity, passes through one or more first Raman cells (303) filled with deuterium as the first gas. In the examples including at least one intra-cavity etalon, given in Table 2, the linewidth of the laser beam is less than approximately 0.1 nm.

TABLE 2

| Intra-Cavity Etalon Selection | Deuterium Convertor Input Pump Energy (mJ) | First-Stokes Energy from Deuterium Convertor (mJ) |
| --- | --- | --- |
| None | 400 | 56 |
| 0.5 mm thick, Reflectivity = 4% | 375 | 75 |
| 0.5 mm thick, Reflectivity = 20% | 365 | 85 |
| 1 mm, Reflectivity = 20% | 350 | 85 |
| 2 mm, Reflectivity = 4% | 330 | 70 |
| 0.5 mm thick, Refl. = 4% and 2 mm thick, Refl. = 4% | 340 | 85 |

As shown in FIG. 3, the Stokes output, from one or more first Raman cells (303) filled with deuterium as the first gas, passes through a collimating-lens system (306) and then passes through a second focusing lens system (307) into a multi-pass system of one or more second Raman cells (304) filled with the second gas (e.g., hydrogen).

In some embodiments, the instant invention can control the focusing angle by utilizing a zoom lens system that controls the size of the beam when it is incident upon the focusing lens (307). In some embodiments, the instant invention can utilize mirrors to achieve high reflectivity and high damage threshold at the pump, first-Stokes, and second-Stokes wavelengths (1000-1025 nm, 1715-1788 nm, 6000-7000 nm, respectively). In some embodiments, the instant invention can control the output energy in the desired wavelength range based on a specific number of passes through one or more second Raman cells (304) filled with the second gas (e.g., hydrogen).

In some embodiments, the instant invention can control the output energy in the desired wavelength range by operating one or more second Raman cells (304) filled with the second gas (e.g., hydrogen) at a pressure of approximately 150-200 psi to obtain the output energy, while minimizing thermo-optic distortions, which could affect beam quality and/or photon conversion efficiency. In some embodiments, the instant invention can control the output energy in the desired wavelength range by maintaining the pressure of at least 150 psi. In some embodiments, the instant invention can control the output energy in the desired wavelength range by maintaining the pressure of at least 155 psi. In some embodiments, the instant invention can control the output energy in the desired wavelength range by maintaining the pressure of at least 160 psi. In some embodiments, the instant invention can control the output energy in the desired wavelength range by maintaining the pressure of at least 170 psi. In some embodiments, the instant invention can control the output energy in the desired wavelength range by maintaining the pressure of at least 175 psi. In some embodiments, the instant invention can control the output energy in the desired wavelength range by maintaining the pressure of at least 180 psi. In some embodiments, the instant invention can control the output energy in the desired wavelength range by maintaining the pressure of at least 200 psi.

In some embodiments, the pump light is focused into one or more second Raman cells (304) filled with the second gas (e.g., hydrogen) such that the optimal numerical aperture (NA) is about 4 mrad, where the NA is the half-angle of the focused beam. In some embodiments, to determine an optimum NA for focusing the light into one or more second Raman cells (304) filled with the second gas (e.g., hydrogen), one or more of the following factors can be considered:

a) If a focusing NA is lower than the optimal NA:

1) the Rayleigh range of the pump beam could be greater than the length of the Raman cell, resulting in lower efficiency, and 2) there could be an increased risk of damaging the coated windows of the Raman cells owing to the smaller beam size on the windows;

b) If a focusing NA is higher than the optimal NA:

1) the efficiency of Raman conversion to the desired wavelengths could be reduced owing to four-wave mixing that seeds the growth of higher-order Stokes beams, 2) the tighter focus that results from higher NA could lead to higher peak intensities, which could enhance other non-linear effects (e.g., self-focusing, Brillouin scattering, and backward-Raman scattering) that compete with the Raman process, and 3) higher NA could result in Stokes heating within a smaller gas volume, leading to larger refractive index changes, causing scattering losses.

Figure 5:
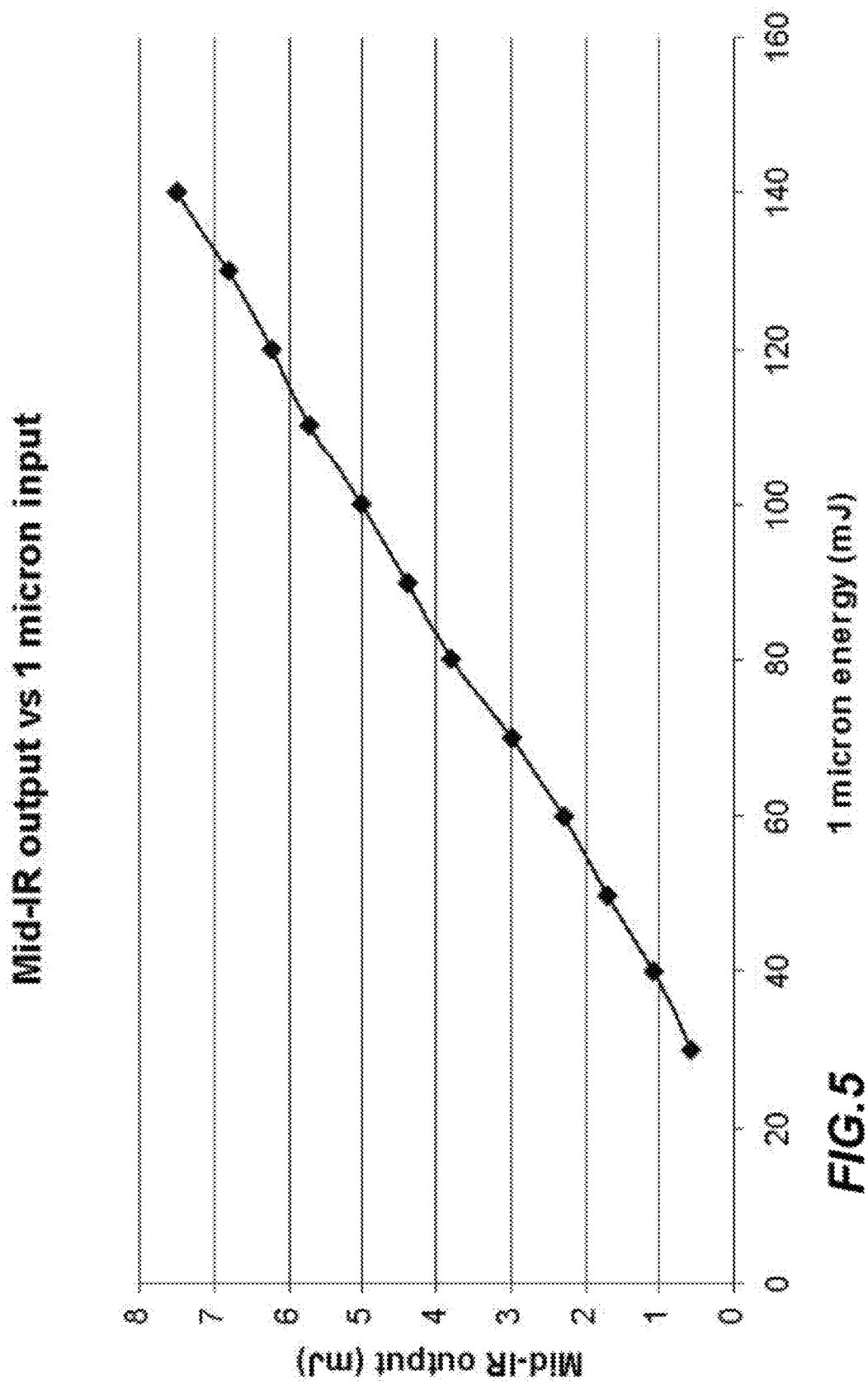
FIG. 5 shows another graph related to some embodiments of the instant invention.

FIG. 5 illustrates a performance of the Raman conversion when the beam has undergoes 15 passes in the second Raman cell (304) filled with hydrogen as the second gas.

Table 3 illustrates output wavelengths and energies of some embodiments operating in accordance with the general scheme shown in FIG. 3.

TABLE 3

| Component | Wavelength (um) | Output Energy |
| --- | --- | --- |
| 301 | 0.774 | 180 mJ |
| 302 | 0.774 | 500 mJ |
| 303 | 1.005 | 135 mJ |
| 304 | 6.105 | 7.5 mJ |

Figure 6A:
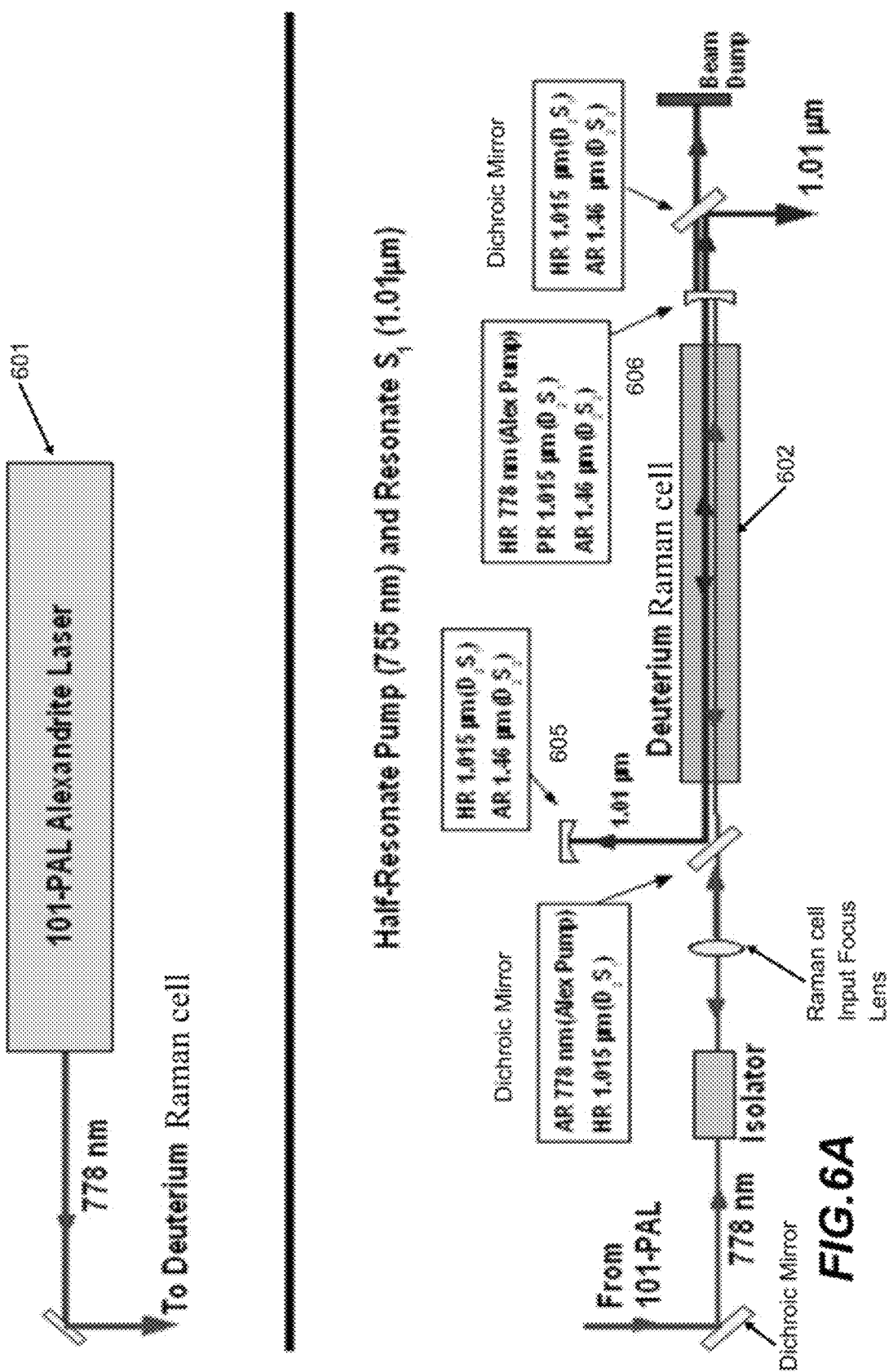
FIGS. 6A-6C show schematic diagrams representing yet some other embodiments of the instant invention.
Figure 6B:
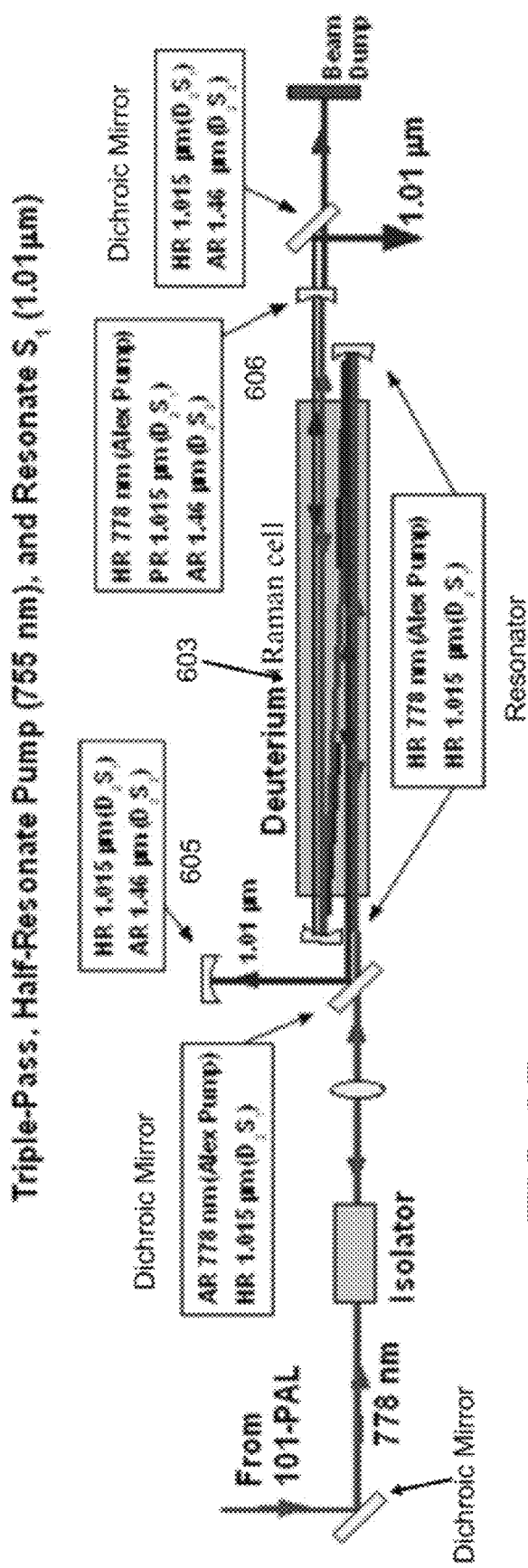
Figure 6C:
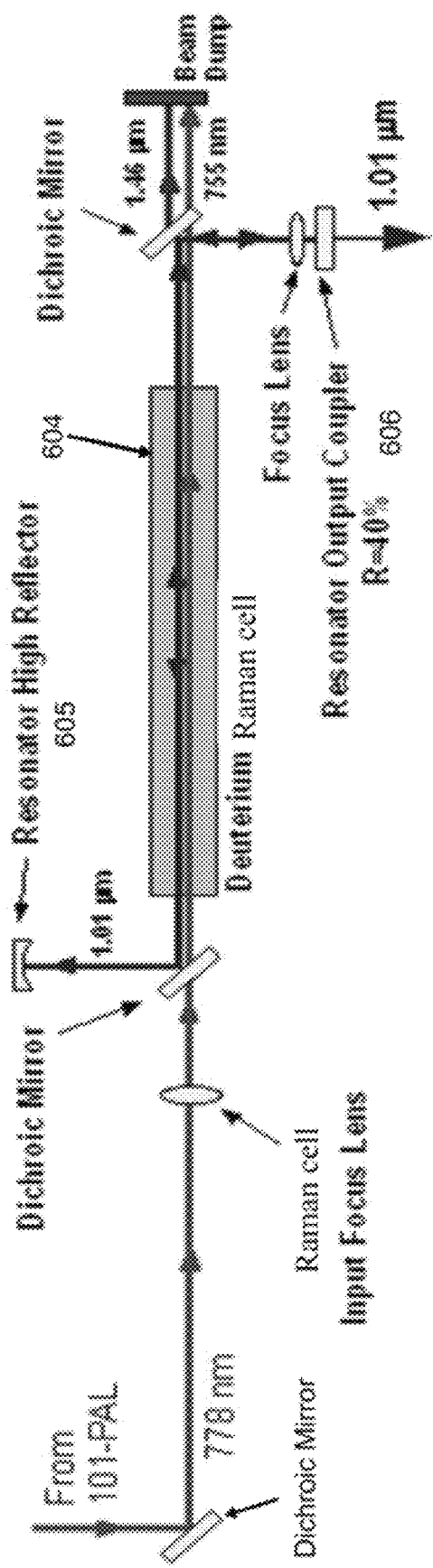

Some Embodiments of the Instant Invention Having Various Arrangements with One or More First Raman Cells Filled with the First Gas FIGS. 6A-6C illustrate various configurations with one or more first Raman cells filled with the first gas (e.g., deuterium) that can be utilized in some embodiments to effect the photon conversion efficiency and stability of the Raman conversion in the first Raman cells. In some embodiments, as shown in FIGS. 6A-6C, the instant invention can utilize the resonator to "trap" and circulate a portion of the pump and Stokes beams, leading to effectively longer interaction lengths and higher energy densities, thereby influencing the conversion.

FIG. 6A shows an exemplary arrangement with one or more first Raman cells (303) filled with the first gas (e.g., deuterium). As shown in FIG. 6A, an output from the alexandrite laser (601) can be directed to one or more first Raman cells (602) filled with the first gas (e.g., deuterium) in which the Stokes beam is "trapped" between a high reflector (605) and a partially reflecting output coupler (606) while the pump beam makes a single back-and-forth pass along an overlapping path.

FIG. 6B shows another exemplary arrangement with one or more first Raman cells (303) filled with the first gas (e.g., deuterium). Based on the principle shown in FIG. 6A, as shown in FIG. 6B, the output from the alexandrite laser (601) can be directed to a three-pass deuterium first Raman cell (603) for which the effective round-trip length, and therefore the round-trip gain, of the circulating beams can be increased by a factor of three.

FIG. 6C shows yet another exemplary arrangement with one or more first Raman cells (303) filled with the first gas (e.g., deuterium). As shown in FIG. 6C, a portion of the Stokes beam can be circulated through one or more first Raman cells (604) back-and-forth between the high reflector (605) and output coupler (606). This can result in a buildup of the Stokes energy, leading to pump depletion and thus increasing the photon conversion efficiency. In some embodiments, the Stokes beam can exit one or more first Raman cells (604) through a 40% output coupler (606). In some embodiments, the Stokes beam can be re-focused at the center of one or more first Raman cells (604) upon each pass.

Figure 7:
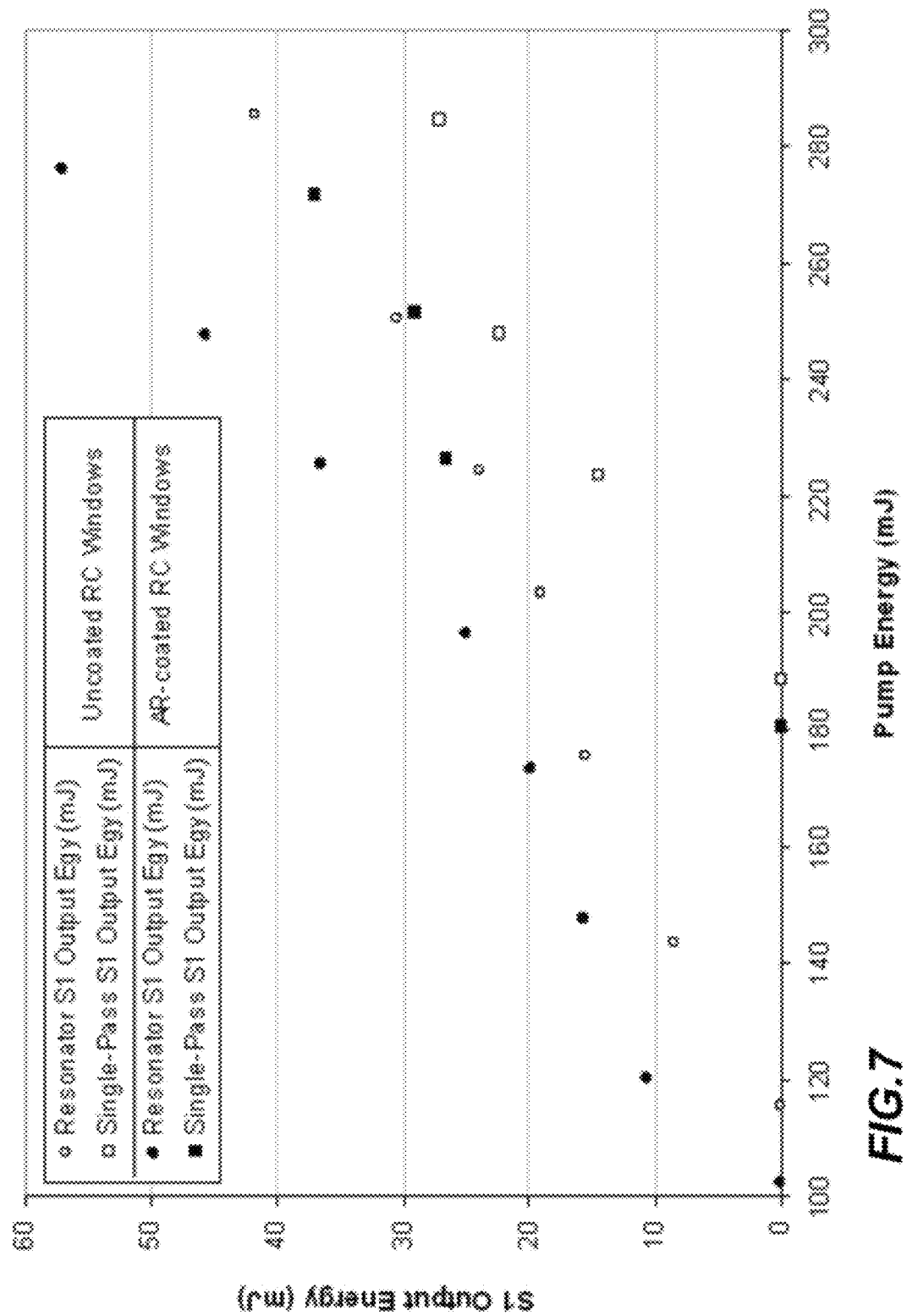
FIG. 7 shows yet another graph related to some embodiments of the instant invention.

FIG. 7 shows a slope efficiency of the Stokes output for two different embodiments of the first Raman cell (604) of FIG. 6C:

a) uncoated windows installed in the first Raman cell (604) that result in Fresnel losses of about 16% per pass;

b) anti-reflection coated windows installed in the first Raman cell (604) that reduce or eliminate the Fresnel losses.

As seen in FIG. 7, the Raman conversion for both the resonator (605) and non-resonator configuration has been improved by operating the first Raman cell (604) with anti-reflection coated windows (e.g., approximately 35% increase in both cases). As shown in FIG. 7, there is an increase in Raman conversion when resonating. Specifically, in some cases, having anti-reflection (AR) coated windows installed in the first Raman cell (604), the output power, while resonating, was 57 mJ for a pump power of 275 mJ, whereas the output power was 37 mJ without resonating. Consequently, with uncoated or coated windows installed in the first Raman cell (604), having the resonator (605) resulted in about 50% increase in Stokes energy for a given pump power. In same cases, as shown in FIG. 7, with the resonator (605), the threshold decreased from approximately 180 mJ/pulse to slightly over 100 mJ/pulse.

Figure 8:
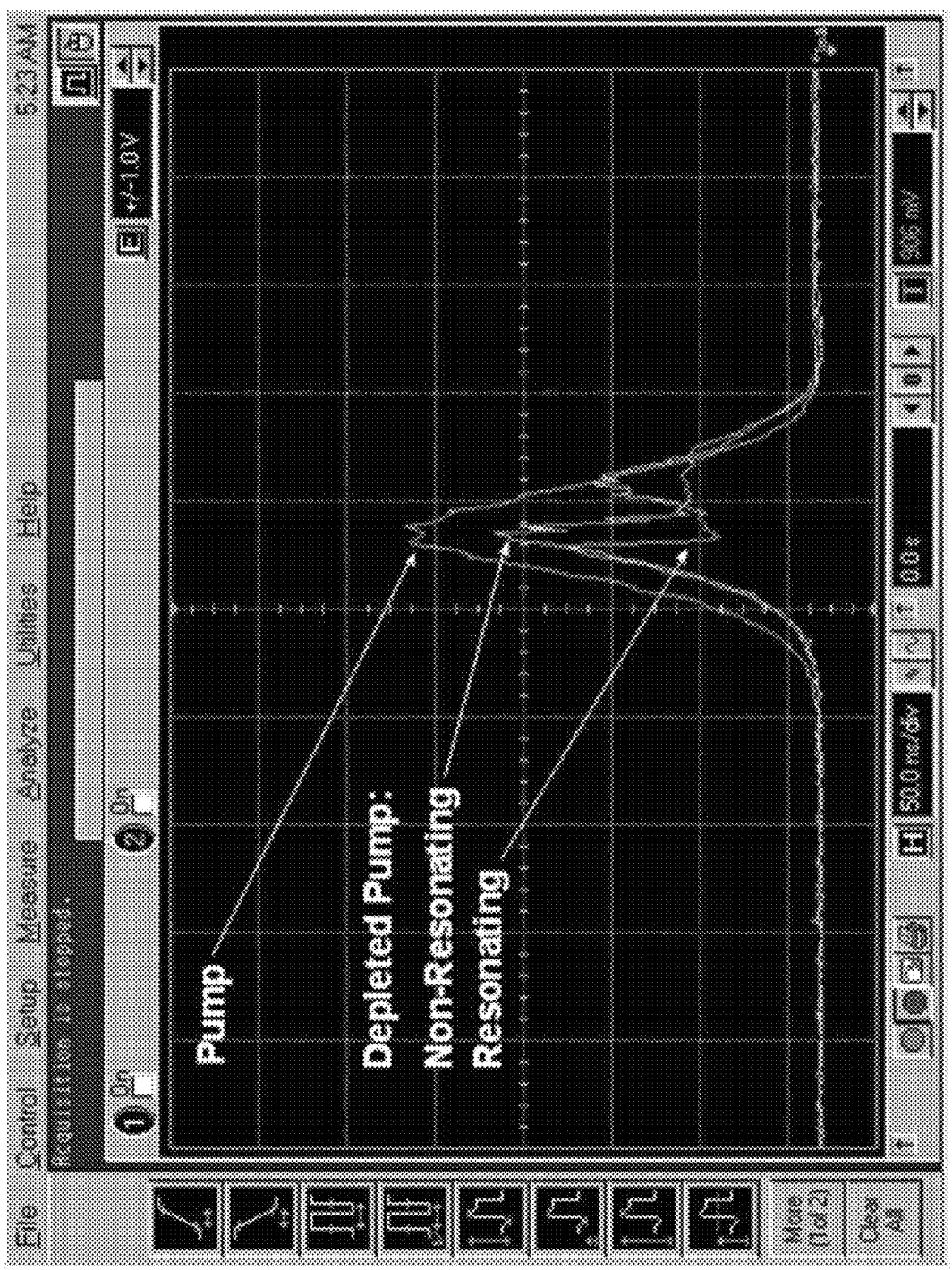
FIG. 8 shows yet another graph related to some embodiments of the instant invention.

FIG. 8 shows the depleted pump signal while resonating as well as without the resonator, operating at a pump energy of 275 mJ/pulse and with the first Raman cell (604) configured with AR-coated windows. In the case without the resonator, the resonator high reflector has been blocked, and the Stokes power has been measured after the dichroic mirror that is situated after the output end of the first Raman cell (604) of FIG. 6C. Such non-resonating mode of operation is generally equivalent to a single-pass Raman configuration of the first Raman cell filled with the first gas (e.g., deuterium).

As seen in FIG. 8, having the resonator (605) resulted in an increase in the pump depletion. Regarding FIG. 8, the slope efficiency measurements have been performed by decreasing the operating voltage of the pump laser in order to decrease the pump power. In some embodiment, having this mode of operation (i.e., decreasing the operating voltage of the pump laser) can have a detrimental effect in that the mode structure and pulse duration of the pump beam could change with pump power, thereby introducing unintended parameter variations. In some embodiments, to avoid the detrimental effect, the instant invention can utilize an attenuator system that can at least include a half-wave plate and a polarizer, to allow for control of the pump power without changing other operating parameters.

In some embodiments, the instant invention can utilize a polarizer and quarter-wave plate as a variable output coupler which can allow for continuous adjustment of the output coupling from 0-100% by means of rotation of the quarter-wave plate, and thus can allow for the determination of the optimal reflectivity for the output coupler (606).

In some embodiments, for Raman conversion in one or more first Raman cells filled with the first gas (e.g., deuterium) (e.g., 303, 602-604), the instant invention can utilize a sufficiently low-power seed to enhance the Raman conversion. In this case in order to obtain a given first Stokes energy from one or more first Raman cells (e.g., 303, 602-604), the pump laser output power requirement can be reduced by a factor of two or more. Consequently, in some embodiments, which utilize the seeding, the number of pump chambers (which is typically one of the costliest elements of the laser system and typically requires the most maintenance due to flashlamp and reflector wear, for example) can be reduced, for example, from three to, potentially, just one, yielding a sizable reduction in system cost as well as improved system reliability. For example, with fewer pump chambers, the electrical and cooling system requirements can be relaxed, leading to an overall reduction in system footprint.

Figure 9:
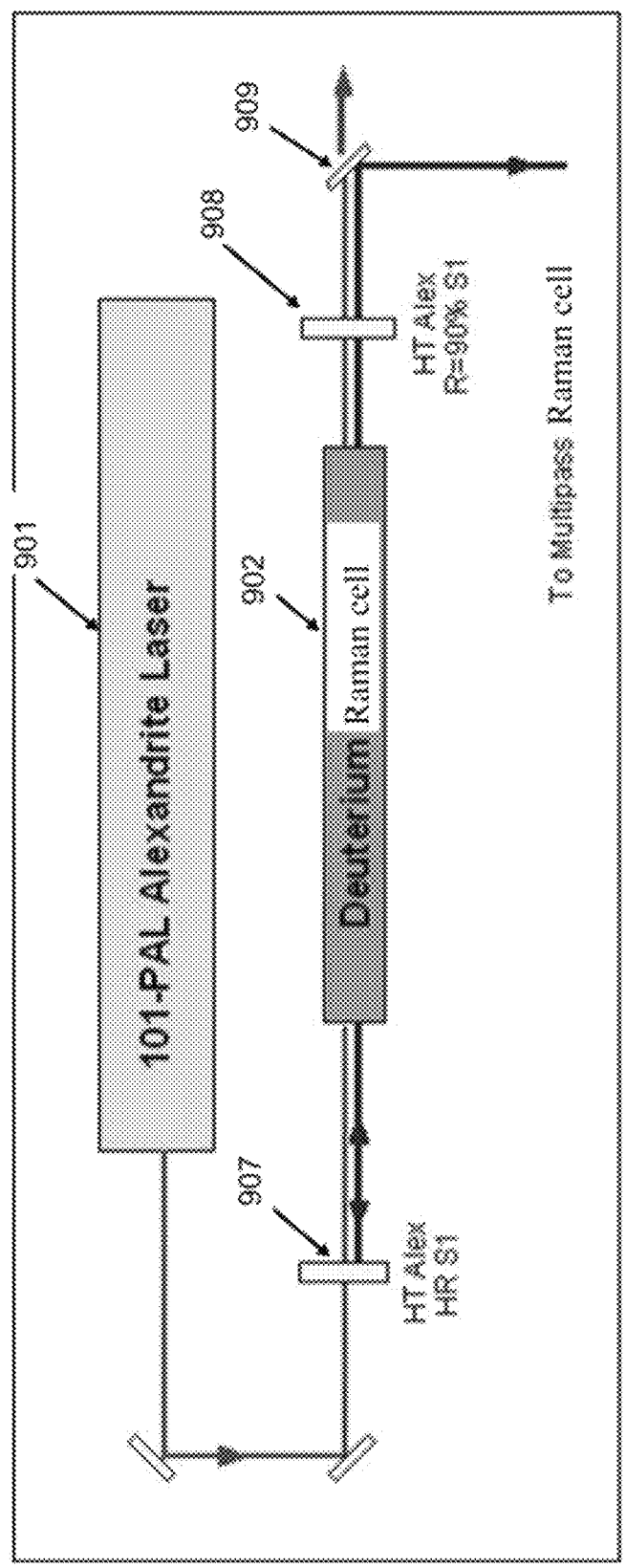
FIG. 9 shows yet another schematic diagram representing yet some other embodiments of the instant invention.

In some embodiments the Raman cell can utilize a resonator which, in essence, provides a seed beam. For example, as FIG. 9 shows, the linear resonator (907-909) can "trap" approximately 10% of the Raman-converted Stokes beam, and can "re-circulate" the beam through one or more first Raman cells (e.g., 303, 602-604) such that it overlaps the pump beam, thereby serving as a seed. Since the output mirror (909) of the resonator (907-909) can be, for example, 90% transmissive, the majority of the circulating Stokes beam can be coupled out of the resonator, where it is directed into one or more second Raman cells filled with the second gas (e.g., hydrogen).

In some embodiments, a weaker focus geometry (i.e., lower NA) can improve the overall photon conversion efficiency. In some embodiments, the instant invention can utilize a pair of crossed cylindrical lenses (instead of a single spherical focusing lens) to generate an astigmatically focused beam that can have a larger area (compared with spherical-lens focusing) on windows of one or more first and/or second Raman cells, yet can yield the Raman conversion efficiency similar to that achieved with a spherical focusing lens. One can utilize laser beam propagation modeling software to determine the optical power of and the spacing between the cylindrical lenses that can yield the desired focus parameters.

In some embodiments, the instant invention can utilize a three-element zoom-lens system to focus the pump beam into one or more first Raman cells (e.g., 303) filled with the first gas (e.g., deuterium). For example, adjusting one of the lenses of the zoom system can provide an ability to continuously adjust the focusing angle. In one example, operating with a relatively shallow focus (low NA), one can mitigate thermo-optic effects that distort the beam profile as well as four-wave mixing effects that lead to undesired conversion to higher Stokes orders. For example, the four-wave mixing can be mitigated since the shallower focus reduces the possibility of phase matching; and the thermo-optic effects can be mitigated since the energy deposited in the gas as the Raman conversion occurs can be deposited over a greater length and larger area. Consequently, in some embodiments described above, by controlling the focusing geometry, one can obtain a repeatable performance, with approximately 100-110 mJ of first-Stokes output, when pumped by approximately 400 mJ from the laser.

While above examples of some embodiments of the instant invention have been described with respect to using deuterium in one or more first Raman cells (e.g., 303, 602-606), other gases can be potentially used that have a Raman shift that is suitably similar to the Raman shift for deuterium. For example, methane can be used in place of deuterium since the Raman shift is suitably similar (Raman shift for deuterium=2991 $cm^{-1}$; Raman shift for methane=2914 $cm^{-1}$).

Some Embodiments of the Instant Invention Having Various Arrangements with One or More Second Raman Cells Filled with the Second Gas In some embodiments, the instant invention can utilize precision template(s) to optimize and qualify a performance of the Raman conversion of the beam that is multi-passed through one or more second Raman cells (e.g., 304) filled with the second gas. The templates facilitate alignment of the pump beam so as to ensure that the laser beam propagates without clipping at the edges of the mirrors. In one example, the templates, which can be positioned with a high degree of accuracy by means of alignment pins, can contain reference holes situated at the positions where the laser beam is meant to strike the multi-pass mirrors when the mirror separation is correctly set, and when the mirrors are properly aligned; and when the input beam is directed at the correct angle. In another example, using the precision templates, the instant invention can allow operation with twenty-three passes of the same beam through one or more second Raman cells (e.g., 304). In some embodiments, the instant invention can utilize the three-lens zoom system to control the focusing parameters of the pump beam that is focused into one or more second Raman cells (e.g., 304).

In some embodiments, there can be a linear increase in output energy as the number of passes is increased from seven to fifteen. In one example, at seven passes, an output energy has been measured to be 2-3 mJ/pulse at a pump energy of 110 mJ/pulse. In another example, for fifteen passes, an output energy of 5-6 mJ/pulse has been measured. In yet another example, at fifteen passes, an output energy has been measured to be up to 7.5 mJ/pulse at a pump energy of 140 mJ/pulse. In some embodiments, as the number of passes is increased beyond fifteen, there can be a leveling-off of the output energy (i.e., the output energy is essentially the same) due to a balance of the reflection losses per pass with the reduced gain per pass owing to pump depletion.

In some embodiments, for achieving output of 6-7 um, the mirrors for multi-passing the beam through one or more second Raman cells filled with the second gas (e.g., hydrogen) can be reflective at wavelengths of approximately 1.0-1.03 um, 1.70-1.80 um, and 6.0-7.0 um. In some embodiments, mirrors operating over such a broad wavelength band can use specialized coatings that are substantially designed so that the damage does not occur at the operating energy densities for each wavelength range. Examples of such mirrors coatings can include, but are not limited to, silver, copper, and multi-layer dielectrics.

In some embodiments, the instant invention can utilize at least one dielectric mirror based on multi-layer coatings to achieve high reflectivity at the pump wavelength (1.01 μm), the first Stokes wavelength (1.75 μm) and the mid-IR wavelength (6-6.5 μm). of the beam that multi-passes within one or more second Raman cells filled with the second gas (e.g., hydrogen), In some embodiments, the instant invention can utilize varies suitable techniques to reduce the presence of water in one or more Raman cells and a consequent water absorption which can effect the mid-IR output. For example, in some embodiments, one or more Raman cells can be repeatedly heated while purging with dry nitrogen to remove water from within the Raman cells.

Figure 10B:
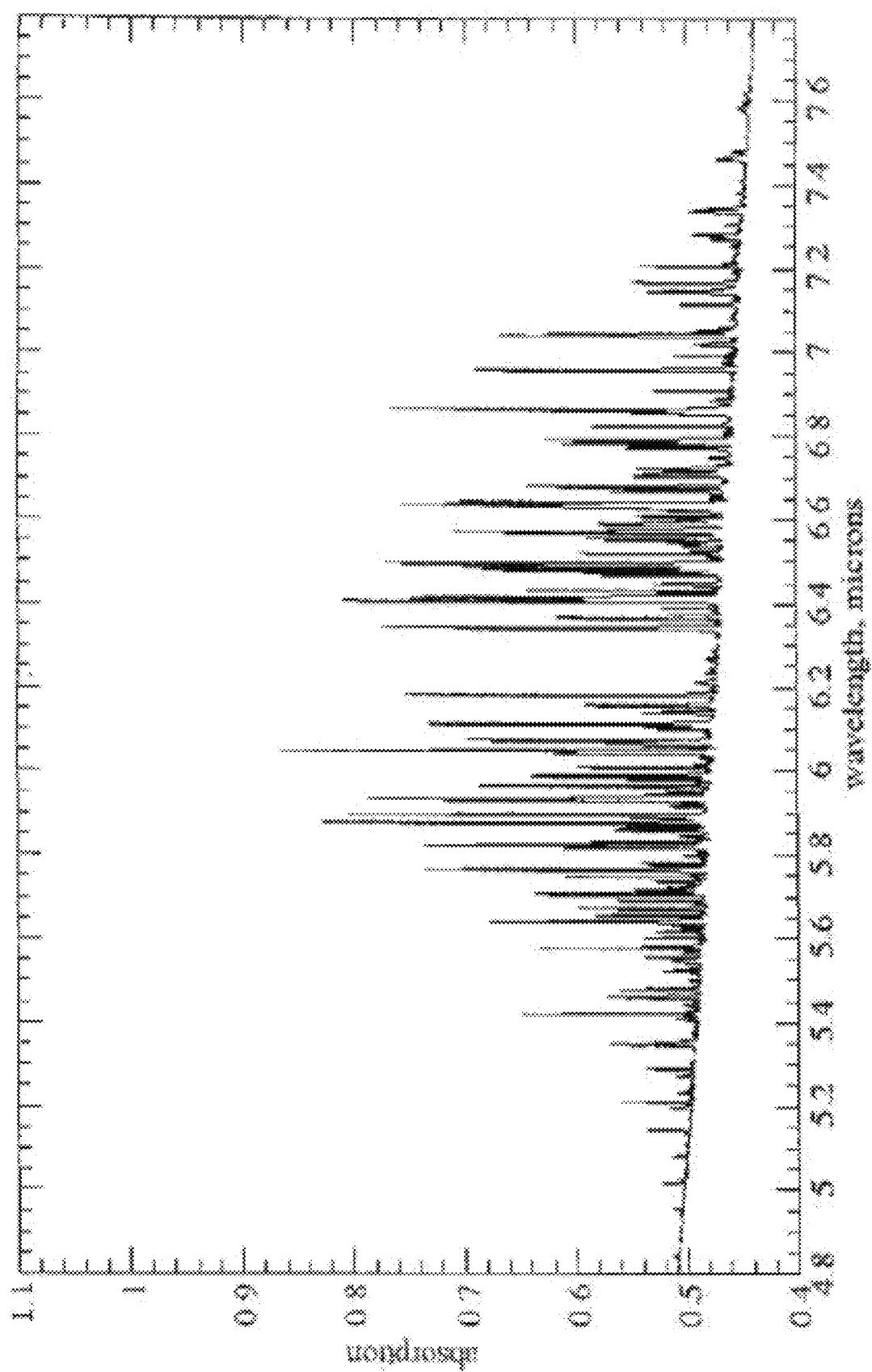
Figure 10C:
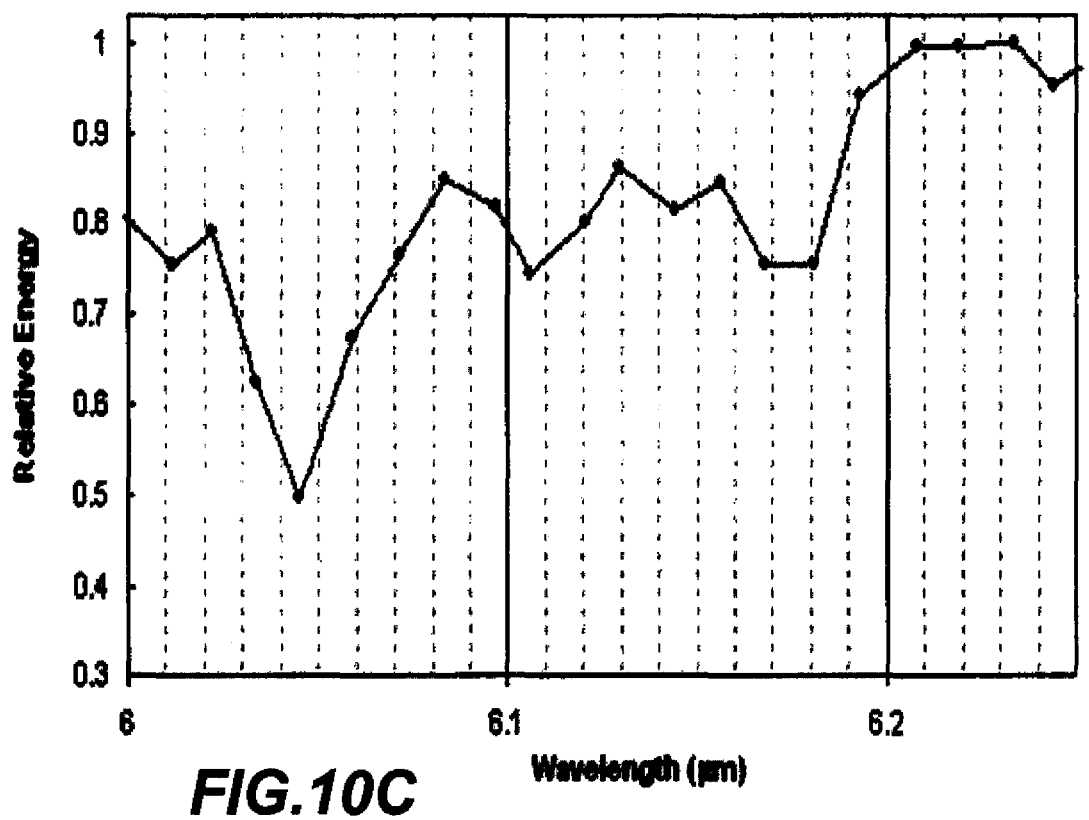

For example, FIG. 10A shows an example of absorption spectra of water vapor. FIG. 10B shows another example of a plot of atmospheric absorption in the 6 um range (absorption is primarily due to water). FIG. 10C shows the measured performance of the Raman cells with presence of water. As seen in these plots, the absorption dips in the measured spectra coincide with the water absorption dips in FIG. 10A, indicating that, for example, the performance of the second Raman cells can depend on water contamination.

Figure 11:
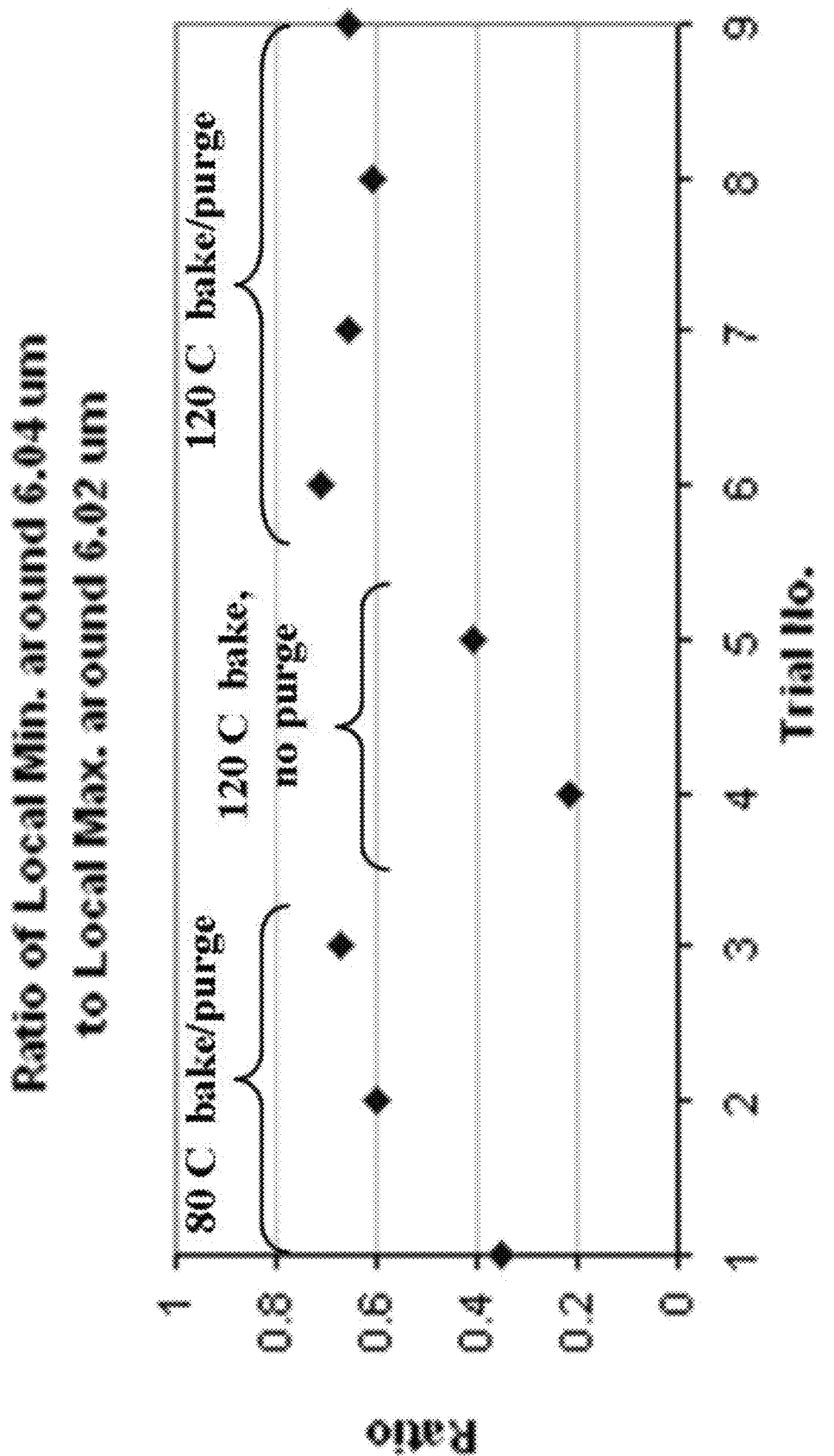
FIG. 11 shows yet another graph related to some embodiments of the instant invention.

For example, FIG. 11 plots a ratio of the local minimum to the local maximum output from the second Raman cells that shows at the strongest absorption dip around 6.04 μm for some embodiments of the instant invention. In some embodiments of the instant invention, the ratio of the local minimum to the local maximum output can be a good metric for measuring water contamination within the Raman cells.

As seen in FIG. 11, in first three trials, the exemplary second Raman cell was baked and purged at a temperature of 80 degrees Celsius (bake/purge times ranged from 4 hr. to 12 hr.). After the first bake/purge cycle, there were dips in the second Raman cell output at the wavelengths where water absorption was strong. The water absorption decreased by a substantial amount after the second bake/purge cycle, and remained essentially the same after the third bake/purge cycle. For example, the first bake/purge was performed after the second Raman cell had been exposed to air for several weeks, and therefore the data from the first three trials suggest that water vapor that was adsorbed on the surfaces of the second Raman cell was liberated and removed by the first two bake/purge cycles, and that little or no additional water was removed by the third cycle.

To determine if the water remaining in the second Raman cell after the third bake/purge cycle was due to water contamination of the bulk hydrogen gas fill, or by water adsorbed on the second Raman cell surfaces, the second Raman cell was baked at a higher temperature (120 deg. C.), without purging, and the performance of the second Raman cell was characterized at the elevated temperature. As seen in FIG. 11, the water absorption increased (Trial 4), indicating that water was desorbed from the second Raman cell surfaces. The converter was then allowed to cool to room temperature, and the measurements were repeated. As seen in the FIG. 11 plot (Trial 5), the water absorption decreased slightly, indicating that some of the water that desorbed during the high-temperature bake, had re-absorbed on the second Raman cell surfaces.

Based on the results of Trial 4 and Trial 5, a series of high temperature (120 deg. degree Celsius) bake/purge cycles were conducted to eliminate adsorbed water from the converter. As seen, the water absorption decreased significantly after the first high temperature bake/purge (Trial 6), but then remained steady after all additional bake/purge cycles (Trials 7, 8, 9). These results show that, for some embodiments, the adsorbed water can be substantially or completely removed by the first high-temperature bake/purge (Trial 6), and that the remaining water, which could not be removed, is an inherent contaminant in hydrogen gas.

For example, the beam can make 17 passes through the same second Raman cell, and the second Raman cell can be 1.5 meter (m) long, such that the total propagation length through hydrogen, as the second gas, can be around 25 m. Consequently, the trace water levels that can be found in the hydrogen gas could affect the Raman conversion performance of some embodiments that have such long effective propagation length and therefore, the removal of water contamination needs to be addressed when, for example, it is desired to have output at wavelengths in the range between 6 and 7 nm. In some embodiments, the concentration of water needs to be below 100 parts per million to achieve the output having desired energy of at least 1 mJ, and at least one wavelength longer than 2.5 micron that coincides with a water absorption line. In some embodiments, the concentration of water needs to be below 10 parts per million to achieve the output having desired energy of at least 1 mJ, and at least one wavelength longer than 2.5 micron that coincides with a water absorption line. In some embodiments, the concentration of water needs to be below 1 part per million to achieve the output having desired energy of at least 1 mJ, and at least one wavelength longer than 2.5 micron that coincides with a water absorption line.

In some embodiments, the instant invention can utilize a gas delivery system that can include a section of coiled gas line, chilled by a thermo-electric cooler, to "freeze out" the water impurities from the hydrogen gas, while the gas is flowed into the Raman cells. In some embodiments, the instant invention can utilize a "cold finger" (e.g., equipment that can be used to generate a localized cold surface), cooled below the freezing point of water, that can be installed on the Raman cells to "freeze out" residual water vapor within the Raman cells.

In some embodiments, the instant invention provides a method that at least includes the steps of: (a) outputting a first laser beam having: a beam quality factor (M2) between 1 and 5, and a spectral width of less than 0.15 nm (FWHM), where the outputting is performed by at least one laser generating component that comprises at least one alexandrite laser oscillator; (b) converting the first laser beam through at least one first Raman cell to produce a second laser beam, where the at least one first Raman cell is filled with a first gas and is operationally positioned to receive the first laser beam outputted by the at least one laser generating component; and (c) converting the second laser beam through at least one second Raman cell to produce a final laser beam, where the at least one second Raman cell is filled with a second gas and is operationally positioned after the at least one first Raman cell, where the first gas and the second gas are different gasses, and where the final laser beam having: a second energy of at least 1 mJ, and at least one wavelength longer than 2.5 micron.

In some embodiments, the instant invention can include the at least one laser generating component that further includes at least one laser amplifier. In some embodiments, the instant invention can result in the first laser beam that has energy of at least 200 mJ.

In some embodiments, the instant invention can include the first gas that is deuterium and the second gas that is hydrogen. In some embodiments, the instant invention can include the at least one second Raman cell filled with hydrogen at a pressure of at least 150 psi.

In some embodiments, the instant invention can include a step of removing at least a portion of water from the at least one second Raman cell. In some embodiments, the removing the at least portion of water can result in a concentration of water in the at least one second Raman cell to be below about 100 parts per million (ppm).

In some embodiments, the instant invention can result in the final laser beam that has: the second energy of at least 4 mJ, and the at least one wavelength is between 6 and 7 nm.

In some embodiments, the instant invention can result in the beam quality factor (M2) is between 1 and 2.5.

In some embodiments, the instant invention can further include steps of: focusing the first laser beam by utilizing at least one first set of zoom focusing lenses, and focusing the second laser beam by utilizing at least one second set of zoom focusing lenses.

In some embodiments, the instant invention can further include steps of: arranging at least one first Raman resonator so that the at least one first Raman resonator is operationally positioned to direct laser beams through the at least one first Raman cell, and arranging at least one second Raman resonator so that that the at least one second Raman resonator is operationally positioned to direct laser beams to pass a plurality of times through the at least one second Raman cell. In some embodiments, the arranging the at least one first Raman resonator is such that the at least one first Raman resonator directs laser beams to pass a plurality of times through the at least one first Raman cell.

In some embodiments, the at least one laser generating component can further include optics having a curvature that results in a size of an output TEMoo mode of the first laser beam that is about 1.5 times smaller than a diameter of an intra-cavity aperture that limits a size of the first laser beam. In some embodiments, the at least one laser generating component can further include at least one etalon selected from the group consisting of: a planar etalon and a confocal etalon.

In some embodiments, the instant invention can further include steps of: circulating, by at least one fan, the first gas in the at least one first Raman cell, hereby minimizing thermo-optic distortions while operating the at least one laser generating component at a repetition rate of at least 5 Hz.

In some embodiments, the instant invention can further include step of directing the final laser beam onto at least one material, hereby changing at least one physical characteristic of the at least one material.

Exemplary Applications of Some Embodiments of the Instant Invention

Since, for example, wavelengths of 6.10 and 6.45 µm can correspond to certain strong absorption bands of tissues, including soft tissue, some embodiments of the instant invention that provide output beams having such wavelengths can be utilized in one or more of the following applications such as medical laser surgery (e.g., ablation of tumors, eye, cardiac, thoracic, and orthopedic surgeries) and/or treatment, inter alia:

a) neurological applications: pain management, intractable epilepsy, nerve welding, and neurosurgery;

b) othalmological applications (e.g., optic nerve sheath fenestration);

c) ablation of bone and cartilage;

d) retinal injury rep air (e.g., retinectomy for traumatic proliferative vitreretinopathy detachment).

While a number of embodiments of the present invention have been described, it is understood that these embodiments are illustrative only, and not restrictive, and that many modifications may become apparent to those of ordinary skill in the art. Further, any steps described herein may be carried out in any desired order (and any steps may be added and/or deleted).

What is claimed is:

1. A method, comprising:
   (a) outputting a first laser beam having:
      a beam quality factor ($M^2$) between 1 and 5, and
      a spectral width of less than 0.15 nm (FWHM),
      wherein the outputting is performed by at least one laser generating component that comprises at least one alexandrite laser oscillator;
   (b) converting the first laser beam through at least one first Raman cell to produce a second laser beam,
      wherein the at least one first Raman cell is filled with a first gas and is operationally positioned to receive the first laser beam outputted by the at least one laser generating component; and
   (c) converting the second laser beam through at least one second Raman cell to produce a final laser beam,
      wherein the at least one second Raman cell is filled with a second gas and is operationally positioned after the at least one first Raman cell,
      wherein the first gas and the second gas are different gasses, and
   wherein the final laser beam having:
      a second energy of at least 1 mJ, and
      at least one wavelength longer than 2.5 micron.

2. The method of claim 1, wherein the at least one laser generating component further comprises at least one laser amplifier.

3. The method of claim 1, wherein the first laser beam has energy of at least 200 mJ.

4. The method of claim 1, wherein the first gas is deuterium and the second gas is hydrogen.

5. The method of claim 4, wherein the at least one second Raman cell filled with hydrogen at a pressure of at least 150 psi.

6. The method of claim 4, wherein the method further comprises:
   removing at least a portion of water from the at least one second Raman cell.

7. The method of claim 6, wherein the removing the at least portion of water results in a concentration of water in the at least one second Raman cell to be below about 100 parts per million (ppm).

8. The method of claim 1, wherein the final laser beam has:
   the second energy of at least 4 mJ, and the at least one wavelength is between 6 and 7 μm or micron.

9. The method of claim 1, wherein the beam quality factor ($M^2$) is between 1 and 2.5.

10. The method of claim 1, wherein the method further comprises:
    focusing the first laser beam by utilizing at least one first set of zoom focusing lenses, and
    focusing the second laser beam by utilizing at least one second set of zoom focusing lenses.

11. The method of claim 1, wherein the method further comprises:
    arranging at least one first Raman resonator so that the at least one first Raman resonator is operationally positioned to direct laser beams through the at least one first Raman cell, and
    arranging at least one second Raman resonator so that that the at least one second Raman resonator is operationally positioned to direct laser beams to pass a plurality of times through the at least one second Raman cell.

12. The method of claim 11, wherein the arranging the at least one first Raman resonator is such that the at least one first Raman resonator directs laser beams to pass a plurality of times through the at least one first Raman cell.

13. The method of claim 1, wherein the at least one laser generating component further comprises optics having a curvature that results in a size of an output $TEM_{00}$ mode of the first laser beam that is about 1.5 times smaller than a diameter of an intra-cavity aperture that limits a size of the first laser beam.

14. The method of claim 1, wherein the method further comprises:
    circulating, by at least one fan, the first gas in the at least one first Raman cell, hereby minimizing thermo-optic distortions while operating the at least one laser generating component at a repetition rate of at least 5 Hz.

15. The method of claim 1, wherein the at least one laser generating component further comprises at least one etalon selected from the group consisting of: a planar etalon and a confocal etalon.

16. The method of claim 1, wherein the method further comprises:
    directing the final laser beam onto at least one material, hereby changing at least one physical characteristic of the at least one material.

* * * * *